US007765101B2

(12) United States Patent
En-Najjary et al.

(10) Patent No.: US 7,765,101 B2
(45) Date of Patent: Jul. 27, 2010

(54) VOICE SIGNAL CONVERSATION METHOD AND SYSTEM

(75) Inventors: Taoufik En-Najjary, Valbonne (FR); Olivier Rosec, Lannion (FR)

(73) Assignee: France Telecom, Paris (FR)

( * ) Notice: Subject to any disclaimer, the term of this patent is extended or adjusted under 35 U.S.C. 154(b) by 974 days.

(21) Appl. No.: 10/594,396

(22) PCT Filed: Mar. 9, 2005

(86) PCT No.: PCT/FR2005/000564

§ 371 (c)(1),
(2), (4) Date: Sep. 26, 2006

(87) PCT Pub. No.: WO2005/106852

PCT Pub. Date: Nov. 10, 2005

(65) Prior Publication Data

US 2007/0208566 A1 Sep. 6, 2007

(30) Foreign Application Priority Data

Mar. 31, 2004 (FR) .................................. 04 03403

(51) Int. Cl.
*G10L 17/00* (2006.01)

(52) U.S. Cl. ....................... 704/246; 704/206; 704/220; 704/221; 704/207

(58) Field of Classification Search ................. 704/246, 704/206, 231, 251, 270–278, 256, 220, 221, 704/207
See application file for complete search history.

(56) References Cited

U.S. PATENT DOCUMENTS 4,975,957 A * 12/1990 Ichikawa et al. ............ 704/220
5,197,113 A * 3/1993 Mumolo ..................... 704/200
5,327,521 A * 7/1994 Savic et al. ................. 704/272
5,381,514 A * 1/1995 Aso et al. ................... 704/264
5,504,834 A * 4/1996 Fette et al. .................. 704/207
5,572,624 A * 11/1996 Sejnoha ................... 704/256.2
5,574,823 A * 11/1996 Hassanein et al. ........... 704/208
6,029,124 A * 2/2000 Gillick et al. ............... 704/200
6,041,297 A * 3/2000 Goldberg .................... 704/219
6,098,037 A * 8/2000 Yeldener .................... 704/221

(Continued)

OTHER PUBLICATIONS

Duxans et al., ("Estimation of GMM in voice conversion including unaligned data", Proceedings of Eurospeech 2003 Conference, Sep. 2003, pp. 861-864).*

(Continued)

*Primary Examiner*—Vijay B Chawan
(74) *Attorney, Agent, or Firm*—Young & Thompson

(57) ABSTRACT

A method of converting a voice signal spoken by a source speaker into a converted voice signal having acoustic characteristics that resemble those of a target speaker. The method includes the following steps: determining (1) at least one function for the transformation of the acoustic characteristics of the source speaker into acoustic characteristics similar to those of the target speaker; and transforming the acoustic characteristics of the voice signal to be converted using the at least one transformation function. The method is characterized in that: (i) the aforementioned transformation function-determining step (1) consists in determining (1) a function for the joint transformation of characteristics relating to the spectral envelope and characteristics relating to the fundamental frequency of the source speaker; and (ii) the transformation includes the application of the joint transformation function.

16 Claims, 5 Drawing Sheets

U.S. PATENT DOCUMENTS

| | | | | |
|---|---|---|---|---|
| 6,199,036 | B1 * | 3/2001 | Ahmadi | 704/207 |
| 6,336,092 | B1 * | 1/2002 | Gibson et al. | 704/268 |
| 6,615,174 | B1 * | 9/2003 | Arslan et al. | 704/270 |
| 6,879,952 | B2 * | 4/2005 | Acero et al. | 704/222 |
| 2001/0037195 | A1 * | 11/2001 | Acero et al. | 704/200 |
| 2005/0137862 | A1 * | 6/2005 | Monkowski | 704/222 |

OTHER PUBLICATIONS

Ching-Hsiang Ho : “Speaker Modelling for Voice Conversation” PhD Thesis, Chapter IV, Online Jul. 2007, pp. 1-29.

Stylianou Y et al: “A system for voice conversion basded on probablistic classification and a harmonic plus noise model” Acoustics, Speech and Signal Processing, 1998.May 12, 1998.

Taoufik En-Najjary et al “A new method for pitch prediction from spectral envelope and its application in voice conversion” Sep. 2003 , pp. 1753.

Kain A et al: “Stochastic modeling of spectral adjustment for high quality pitch modification” Jun. 5, 2000, pp. 949-952.

Yining Chen1 et al: “Voice Conversion with Smoothed GMM and MAP Adaptation” Sep. 2003, pp. 2413-2416.

* cited by examiner

VOICE SIGNAL CONVERSATION METHOD AND SYSTEM

BACKGROUND OF THE INVENTION

The present invention relates to a method and to a system for converting a voice signal that reproduces a source speaker's voice into a voice signal that has acoustic characteristics resembling those of a target speaker's voice.

Sound reproduction is of primary importance in voice conversion applications such as voice services, oral man-machine dialogue and voice synthesis from text, and to obtain acceptable reproduction quality the acoustic parameters of the voice signals must be closely controlled.

The main acoustic or prosody parameters modified by conventional voice conversion methods are the parameters relating to the spectral envelope and, in the case of voiced sounds involving vibration of the vocal chords, the parameters relating to their periodic structure, i.e. their fundamental period, the reciprocal of which is called the fundamental frequency or pitch.

Conventional voice conversion methods are essentially based on modifications of the spectral envelope characteristics and on overall modifications of the pitch characteristics.

A recent study, published on the occasion of the EUROSPEECH 2003 conference under the title "A new method for pitch prediction from spectral envelope and its application in voice conversion" by Taoufik En-Najjary, Olivier Rosec, and Thierry Chonavel, foresees the possibility of refining the modification of the pitch characteristics by defining a function for predicting those characteristics as a function of spectral envelope characteristics.

Their approach therefore modifies the spectral envelope characteristics and modifies the pitch characteristics as a function of the spectral envelope characteristics.

However, that method has a serious drawback in that it makes modification of the pitch characteristics dependent on modification of the spectral envelope characteristics. An error in spectral envelope conversion therefore inevitably impacts on pitch prediction.

Moreover, the use of a method of the above kind requires two major calculation steps, namely modifying the spectral envelope characteristics and predicting the pitch, thereby doubling the complexity of the system as a whole.

SUMMARY OF THE INVENTION

The object of the present invention is to solve these problems by defining a simple and more effective voice conversion method.

To this end, the present invention consists in a method of converting a voice signal as spoken by a source speaker into a converted voice signal whose acoustic characteristics resemble those of a target speaker, the method comprising:

- a determination step of determining a function for transforming acoustic characteristics of the source speaker into acoustic characteristics similar to those of the target speaker on the basis of samples of the voices of the source and target speakers, and
- a transformation step of transforming acoustic characteristics of the source speaker voice signal to be converted by applying said transformation function, which method is characterized in that said determination step comprises a step of determining a function for conjoint transformation of characteristics of the source speaker relating to the spectral envelope and of characteristics of the source speaker relating to the pitch and said transformation step comprises applying said joint transformation function.

The method of the invention therefore modifies the spectral envelope characteristics and the pitch characteristics simultaneously in a single operation without making them interdependent.

According to other features of the invention:

- said step of determining a joint transformation function comprises:
  - a step of analyzing source and target speaker voice samples grouped into frames to obtain for each frame information relating to the spectral envelope and to the pitch,
  - a step of concatenating information relating to the spectral envelope and information relating to the pitch for each of the source and target speakers,
  - a step of determining a model representing common acoustic characteristics of source speaker and target speaker voice samples, and
  - a step of determining said conjoint transformation function from said model and the voice samples;
- said steps of analyzing the source and target speaker voice samples are adapted to produce said information relating to the spectral envelope in the form of cepstral coefficients;
- said analysis steps comprise respectively a step achieving voice samples models as a summation of an harmonic and noise, each achieving step comprising
  - a substep of estimating the pitch of the voice samples,
  - a substep of synchronized analyzing the pitch of each samples frame, and
  - a substep of estimating spectral envelope parameters of each sample frame;
- said step of determining a model determines a mixture model of Gaussian probability density
- said step of determining a model comprises:
  - a substep of determining a model corresponding to a mixture of Gaussian probability densities, and
  - a substep of estimating parameters of the mixture of Gaussian probability densities from an estimated maximum likelihood between the acoustic characteristics of the source and target speaker samples and the model;
- said step of determining a transformation function further includes a step of normalizing the pitch of the frames of respective source and target speaker samples relative to average values of the pitch of the respective analyzed source and target speaker samples;
- the method includes a step of temporally aligning the acoustic characteristics of the source speaker with the acoustic characteristics of the target speaker, this step being achieved before said step of determining a model;
- the method includes a step of separating voiced frames and non-voiced frames in the source speaker and target speaker voice samples, said step of determining a conjoint transformation function of the characteristics relating to the spectral envelope and to the pitch being based entirely on said voiced frames and the method including a step of determining a function for transformation of only the spectral envelope characteristics on the basis only of said non-voiced frames;
- said step of determining a transformation function comprises only said step of determining a conjoint transformation function;
- said step of determining a conjoint transformation function is based on an estimate of the acoustic characteristics of the target speaker, the acoustic characteristics of the source speaker being known ;

said estimate is the conditional expectation of the acoustic characteristics of the target speaker achievement of the acoustic characteristics of the source speaker being known;

said step of transforming acoustic characteristics of the voice signal to be converted comprises:

a step of analyzing said voice signal, grouped into frames, to obtain for each frame information relating to the spectral envelope and to the pitch, a step of formatting the acoustic information relating to the spectral envelope and to the pitch of the voice signal to be converted, and a step of transforming the formatted acoustic information of the voice signal to be converted using said conjoint transformation function;

the method includes a step of separating voiced frames and non-voiced frames in said voice signal to be converted, said transformation step comprising:

a substep of applying said conjoint transformation function only to voiced frames of said signal to be converted, and a substep of applying said transformation function of the spectral envelope characteristics only to non-voiced frames of said signal to be converted;

said transformation step comprises applying said conjoint transformation function to the acoustic characteristics of all the frames of said voice signal to be converted;

the method further includes a step of synthesizing a converted voice signal from said transformed acoustic information.

The object of the invention is also a system for converting a voice signal as spoken by a source speaker into a converted voice signal whose acoustic characteristics resemble those of a target speaker, the system comprising:

means for determining a function for transforming acoustic characteristics of the source speaker into acoustic characteristics close to those of the target speaker on the basis of voice samples as spoken by the source and target speakers, and means for transforming acoustic characteristics of the source speaker voice signal to be converted by applying said transformation function, the said system is characterized in that said means for determining a transformation function comprise a unit for determining a function for conjoint transformation of characteristics of the source speaker relating to the spectral envelope and of characteristics of the source speaker relating to the pitch and said transformation means include means for applying said conjoint transformation function.

According to other features of the above system:

it further includes:

means for analyzing the voice signal to be converted, adapted to output information relating to the spectral envelope and to the pitch of the voice signal to be converted, and synthesizer means for forming a converted voice signal from at least said spectral envelope and pitch information transformed simultaneously; and said means for determining an acoustic characteristic transformation function further include a unit for determining a transformation function for the spectral envelope of non-voiced frames, said unit for determining the conjoint transformation function being adapted to determine the conjoint transformation function only for voiced frames.

BRIEF DESCRIPTION OF THE DRAWINGS

The invention can be better understood after reading the following description, which is given by way of example only and with reference to the appended drawings, in which.

DESCRIPTION OF PREFERRED EMBODIMENTS

Voice conversion consists in modifying a voice signal reproducing the voice of a reference speaker, called the source speaker, so that the converted signal appears to reproduce the voice of another speaker, called the target speaker.

A method of this kind begins by determining functions for converting acoustic or prosody characteristics of the voice signals for the source speaker into acoustic characteristics close to those of the voice signals for the target speaker on the basis of voice samples as spoken by the source speaker and the target speaker.

A conversion function determination step 1 is more particularly based on databases of voice samples corresponding to the acoustic production of the same phonetic sequences as spoken by the source and target speakers.

Figure 1A:
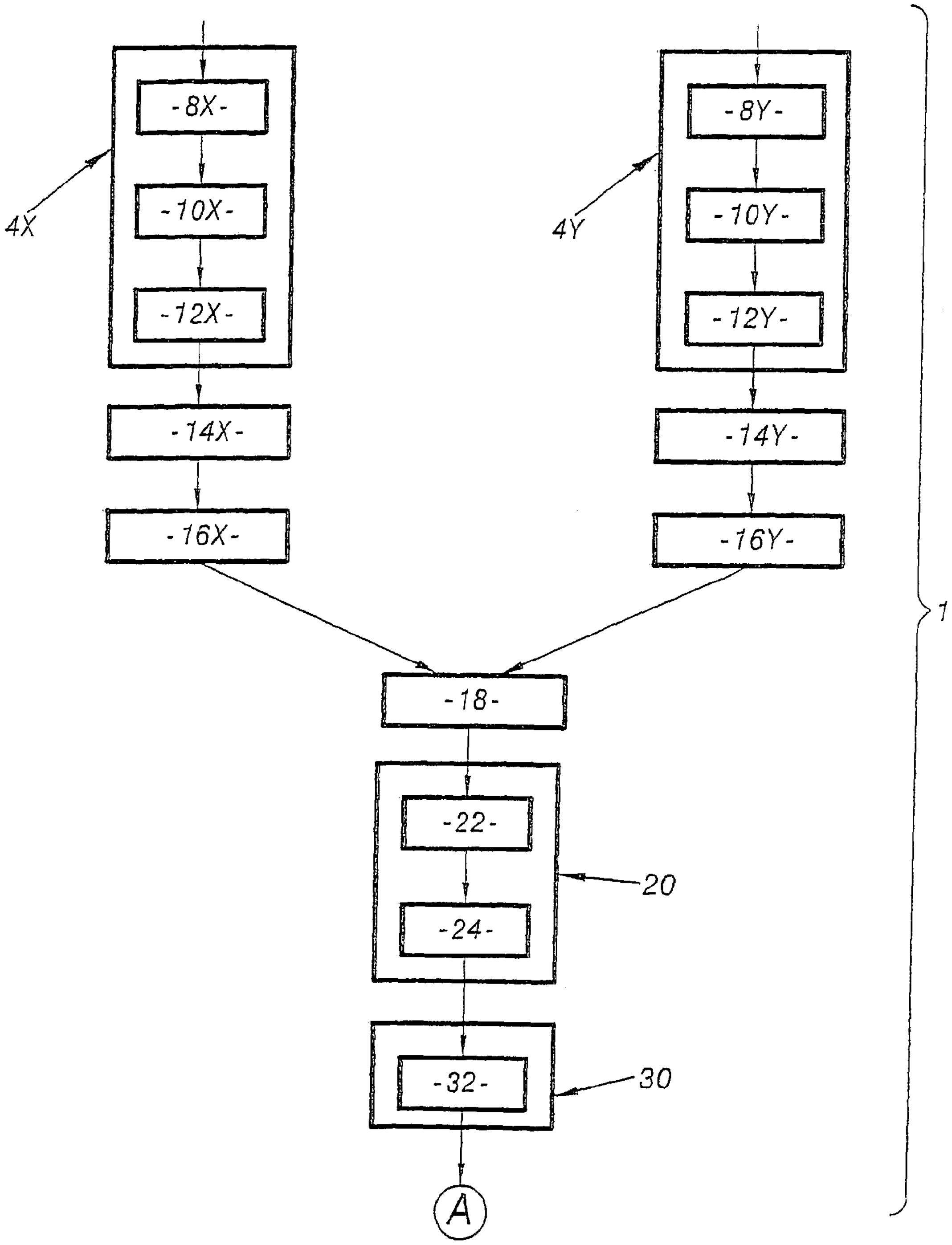
FIGS. 1A and 1B together form a general flowchart of a first embodiment of the method according to the invention.

This process, which is often referred to as “training”, is designated by the general reference number 1 in FIG. 1A.

Figure 1B:
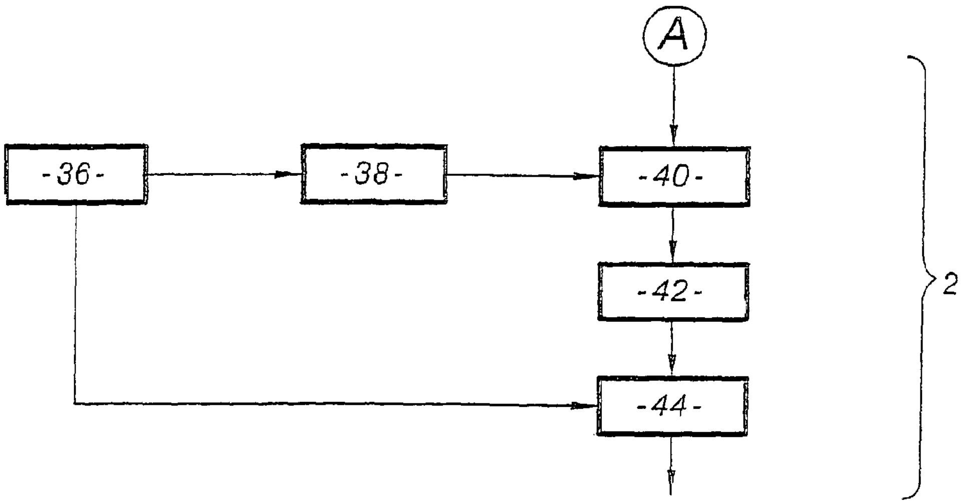

The method then uses the function(s) that have been determined to convert the acoustic characteristics of a voice signal to be converted as spoken by the source speaker. In FIG. 1B this conversion process is designated by the general reference number 2.

The method starts with steps 4X and 4Y that analyze voice samples as spoken by the source and target speakers, respectively. The samples are grouped into frames in these steps in order to obtain spectral envelope information and pitch information for each frame.

In the present embodiment, the analysis steps 4X and 4Y use a sound signal model formed with the sum of a harmonic signal and a noise signal, usually called the harmonic plus noise model (HNM).

The harmonic plus noise model models each voice signal frame as a harmonic portion representing the periodic component of the signal, consisting of a sum of L harmonic sinusoids of amplitude Al and phase $\phi_1$, and a noise portion representing friction noise and the variation of glottal excitation.

We may therefore write:

$$s(n)=h(n)+b(n)$$

where:

$$h(n)=\sum_{l=1}^{L} A_l(n)\cos(\phi_l(n))$$

The term h(n) therefore represents the harmonic approximation of the signal s(n).

The present embodiment is based on representing the spectral envelope by means of a discrete cepstrum.

The steps 4X and 4Y include substeps 8X and 8Y that estimate the pitch for each frame, for example using an autocorrelation method.

The substeps 8X and 8Y are followed by substeps 10X and 10Y of pitch synchronized analysis of each frame in order to estimate the parameters of the harmonic portion of the signal and the parameters of the noise, in particular the maximum voicing frequency. Alternatively, this frequency may be fixed arbitrarily or estimated by other means known in the art.

In the present embodiment, this synchronized analysis determines the parameters of the harmonics by minimizing a weighted least squares criterion between the complete signal and its harmonic decomposition, corresponding in the present embodiment to the estimated noise signal. The criterion E is given by the following equation, in which w(n) is the analysis window and $T_i$ is the fundamental period of the current frame:

$$E = \sum_{n=-T_i}^{T_i} w^2(n)(s(n) - h(n))^2$$

The analysis window is therefore centered around the mark of the fundamental period and its duration is twice that period.

Alternatively, these analyses are effected asynchronously using a fixed analysis step and a fixed window size.

The analysis steps 4X and 4Y finally include substeps 12X and 12Y that estimate the parameters of the spectral envelope of the signals using a regularized discrete cepstrum method and a Bark scale transformation, for example, to reproduce the properties of the human ear as faithfully as possible.

For each frame of rank n of voice signal samples, the analysis steps 4X and 4Y therefore deliver, for the voice samples as spoken by the source and target speakers, respectively, a scalar $F_n$ representing the pitch and a vector $c_n$ comprising spectral envelope information in the form of a sequence of cepstral coefficients.

The cepstral coefficients are calculated by a method that is known in the art and for this reason is not described in detail here.

The analysis steps 4X and 4Y are advantageously followed by steps 14X and 14Y that normalize the value of the pitch of each frame relative to the pitch of the source and target speakers, respectively, in order to replace the pitch value for each voice sample frame with a pitch value normalized according to the following formula:

$$g = F_{log} = \log\left(\frac{F_o}{F_o^{avg}}\right)$$

In the above formula, $F_o^{avg}$ corresponds to the averages of the pitch values over each database analyzed, i.e. over the database of source speaker and target speaker voice samples.

For each speaker, this normalization modifies the pitch scalar variation scale to render it consistent with the cepstral coefficient variation scale. For each frame n, $g_x(n)$ is the pitch normalized for the source speaker and $g_y(n)$ is the pitch normalized for the target speaker.

The method of the invention then includes steps 16X and 16Y that concatenate spectral envelope and pitch information in the form of a single vector for each source and target speaker.

Thus the step 16X defines for each frame n a vector $x_n$ grouping together the cepstral coefficients $c_x(n)$ and the normalized pitch $g_x(n)$ in accordance with the following equation, in which T denotes the transposition operator:

$$x_n = [C_x^T(n), g_x(n)]^T$$

Similarly, the step 16Y defines for each frame n a vector $y_n$ grouping together the cepstral coefficients $c_y(n)$ and the normalized pitch $g_y(n)$ in accordance with the following equation:

$$y_n = [c_y^T(n), g_y(n)]^T$$

The steps 16X and 16Y are followed by a step 18 that aligns the source vector $x_n$ and the target vector $y_n$ to match these vectors by means of a conventional dynamic time warping algorithm.

Alternatively, the alignment step 18 is implemented on the basis of only the cepstral coefficients, without using the pitch information.

The alignment step 18 therefore delivers a pair vector formed of pairs of cepstral coefficients and pitch information for the source and target speakers, aligned temporally.

The alignment step 18 is followed by a step 20 that determines a model representing acoustic characteristics common to the source speaker and the target speaker from the spectral envelope and pitch information for all of the samples that have been analyzed.

In the present embodiment, this model is a probabilistic model of the target speaker and source speaker acoustic characteristics in the form of a Gaussian mixture model (GMM) utilizing a mixture of probability densities and the parameters thereof are estimated from source and target vectors containing the normalized pitch and the discrete cepstrum for each speaker.

In a Gaussian mixture model (GMM) the probability density of a random variable p(z) is conventionally expressed in the following mathematical form:

$$p(z) = \sum_{i=1}^{Q} \alpha_i x(z, \mu; \Sigma_i)$$

where:

$$\sum_{i=1}^{Q} \alpha_i = 1, \quad 0 \le \alpha_i \le 1$$

In the above formula, Q denotes the number of components of the model, $N(z;\mu_i,\Sigma_i)$ is the probability density of the normal law with average $\mu_i$ and covariance matrix $\Sigma_i$, and the coefficients $\alpha_i$ are the coefficients of the mixture.

The coefficient $\alpha_i$ therefore corresponds to the a priori probability that the random variable z is generated by the $i^{th}$ Gaussian component of the mixture.

The step 20 that determines the model more particularly includes a substep 22 that models the conjoint density p(z) of the source vector x and the target vector y such that:

$$Z_n = [x_n^T, y_n^T]^T$$

The step 20 then includes a substep 24 that estimates the GMM parameters (α, μ, Σ) of the density p(z), for example using a conventional algorithm of the Expectation—Maximization (EM) type corresponding to an iterative method of estimating the maximum likelihood between the data of the voice samples and the Gaussian mixture model.

The initial GMM parameters are determined using a conventional vector quantizing technique.

The step 20 that determines the model therefore delivers the parameters of a Gaussian probability density mixture representing common acoustic characteristics of the source speaker and target speaker voice samples, in particular their spectral envelope and pitch characteristics.

The method then includes a step 30 that determines from the model and the voice samples a conjoint function that transforms the pitch and spectral envelopes of the signal obtained from the cepstrum from the source speaker to the target speaker.

This transformation function is determined from an estimate of the acoustic characteristics of the target speaker produced from the acoustic characteristics of the source speaker, taking the form in the present embodiment of the conditional expectation.

To this end, the step 30 includes a substep 32 that determines the conditional expectation of the acoustic characteristics of the target speaker given the acoustic characteristics information for the source speaker. The conditional expectation F(x) is determined from the following formulas:

$$F(x) = E[y \mid x] = \sum_{i=1}^{O} h_i(x)[\mu_i^y + \Sigma_i^{yx}(\Sigma_i^{xx})^{-1}(x - \mu_i^x)]$$

$$\text{where: } h_i(x) = \frac{\alpha N(x, \mu_i^x, \Sigma_i^{xx})}{\sum_{j=1}^{O} \alpha N(x, \mu_j^x, \Sigma_j^{xx})}$$

$$\text{where: } \Sigma = \begin{bmatrix} \Sigma_i^{xx} & \Sigma_i^{xy} \\ \Sigma_i^{yx} & \Sigma_i^{yy} \end{bmatrix} \text{ and } \mu_i \begin{bmatrix} \mu_i^x \\ \mu_i^y \end{bmatrix}$$

In the above equations, $h_i(x)$ is the a posteriori probability that the source vector x is generated by the $i^{th}$ component of the Gaussian density mixture model of the model.

Determining the conditional expectation therefore yields the function for conjoint transformation of the spectral envelope and pitch characteristics between the source speaker and the target speaker.

It is therefore apparent that, from the model and the voice samples, the analysis method of the invention yields a function for conjoint transformation of the pitch and spectral envelope acoustic characteristics.

Referring to FIG. 1B, the conversion method then includes the step 2 of transforming a voice signal to be converted, as spoken by the source speaker, which may be different from the voice signals used here above.

This transformation step 2 starts with an analysis step 36 which, in the present embodiment, effects an HNM breakdown similar to those effected in the steps 4X and 4Y described above. This step 36 delivers spectral envelope information in the form of cepstral coefficients, pitch information and maximum voicing frequency and phase information.

The step 36 is followed by a step 38 that formats the acoustic characteristics of the signal to be converted by normalization of the pitch and concatenation with the cepstral coefficients in order to form a single vector.

That single vector is used in a step 40 that transforms the acoustic characteristics of the voice signal to be converted by applying the transformation function determined in the step 30 to the cepstral coefficients of the signal to be converted defined in the step 36 and to the pitch information.

Thus after the step 40, each frame of source speaker samples of the signal to be converted is associated with simultaneously transformed spectral envelope and pitch information the characteristics thereof are similar to those of the target speaker samples.

The method then includes a step 42 that denormalizes the transformed pitch information.

This step 42 returns the transformed pitch information to a scale appropriate to the target speaker, in accordance with the following equation:

$$F_o[F(x)] = F_o^{avg}(y) \cdot e^{F[g_x(n)]}$$

In the above equation $F_o[F(x)]$ is the denormalized transformed pitch, $F_o^{avg}(y)$ is the average of the values of the pitch of the target speaker, and $F[g_x(n)]$ is the transform of the normalized pitch of the source speaker.

The conversion method then includes a conventional step 44 that synthesizes the output signal, in the present example by an HNM type synthesis that delivers directly the voice signal converted from the transformed spectral envelope and pitch information produced by the step 40 and the maximum voicing frequency and phase information produced by the step 36.

The voice conversion method using the analysis method of the invention therefore yields a voice conversion that jointly achieves spectral envelope and pitch modifications to obtain sound reproduction of good quality.

A second embodiment of the method according to the invention is described next with reference to the general flowchart shown in FIG. 2A.

As here above, this embodiment of the method includes the determination 1 of functions for transforming acoustic characteristics of the source speaker into acoustic characteristics close to those of the target speaker.

This determination step 1 starts with the execution of the steps 4X and 4Y of analyzing voice samples as spoken by the source speaker and the target speaker, respectively.

These steps 4X and 4Y use the harmonic plus noise model (HNM) described above and each produces a scalar F(n) representing the pitch and a vector c(n) comprising spectral envelope information in the form of a sequence of cepstral coefficients.

In this embodiment, these analysis steps 4X and 4Y are followed by a step 50 of aligning the cepstral coefficient vectors obtained by analyzing the source speaker and target speaker frames.

This step 50 is executed by an algorithm such as the DTW algorithm, in a similar manner to the step 18 of the first embodiment.

After the alignment step 50, a pair vector is available formed of pairs of cepstral coefficients for the source speaker and the target speaker, aligned temporally. This pair vector is also associated with the pitch information.

The alignment step 50 is followed by a separation step 54 in which voiced frames and non-voiced frames in the pair vector are separated.

Only the voiced frames have a pitch and the frames can be sorted by considering whether pitch information exists for each pair of the pair vector.

This separation step 54 enables the subsequent step 56 of determining a function for conjoint transformation of the spectral envelope and pitch characteristics of voiced frames and the subsequent step 58 of determining a function for transformation of only the spectral envelope characteristics of non-voiced frames.

The step 56 of determining a transformation function for voiced frames starts with steps 60X and 60Y of normalizing the pitch information for the source and target speakers, respectively.

These steps 60X and 60Y are executed in a similar way to the steps 14X and 14Y of the first embodiment and, for each voiced frame, produce the normalized frequencies $g_x(n)$ for the source speaker and $g_y(n)$ for the target speaker.

These normalization steps 60X and 60Y are followed by steps 62X and 62Y that concatenate the cepstral coefficients $c_x$ and $c_y$ for the source speaker and the target speaker, respectively, with the normalized frequencies $g_x$ and $g_y$.

These concatenation steps 62X and 62Y are executed in a similar way to the steps 16X and 16Y and produce a vector $x_n$ containing spectral envelope and pitch information for voiced frames from the source speaker and a vector $y_n$ containing normalized spectral envelope and pitch information for voiced frames from the target speaker.

In addition, the alignment between these two vectors is kept as achieved at the end of the step 50, the modifications made during the normalization steps 60X and 60Y and the concatenation steps 62X and 62Y being effected directly on the vector outputted from the alignment step 50.

The method next includes a step 70 of determining a model representing the common characteristics of the source speaker and the target speaker.

Differing in this respect from the step 20 described with reference to FIG. 1A, this step 70 uses pitch and spectral envelope information of only the analyzed voiced samples.

In this embodiment, this step 70 is based on a probabilistic model according to a Gaussian mixture model (GMM).

Thus the step 70 includes a substep 72 of modeling the conjoint density for the vectors X and Y executed in a similar way to the substep 22 described above.

This substep 72 is followed by a substep 74 for estimating the GMM parameters ($\alpha$, $\mu$, $\Sigma$) of the density p(z).

As in the embodiment described above, this estimate is obtained using an EM-type algorithm resulting in obtaining an estimate of the maximum likelihood between the voice sample data and the Gaussian mixture model.

The step 70 therefore delivers the parameters of a Gaussian probability density mixture representing the common spectral envelope and pitch acoustic characteristics of the voiced source speaker and target speaker voice samples.

The step 70 is followed by a step 80 of determining a function for conjoint transformation of the pitch and the spectral envelope of the voiced voice samples from the source speaker to the target speaker.

This step 80 is operated in a similar way as the step 30 of the first embodiment and in particular includes a substep 82 of determining the conditional expectation of the acoustic characteristics of the target speaker given the acoustic characteristics of the source speaker, this substep applying the same formulas as here above to the voiced samples.

The step 80 therefore yields a function for conjoint transformation of the spectral envelope and pitch characteristics between the source speaker and the target speaker that is applicable to the voiced frames.

A step 58 of determining a transformation function for the spectral envelope characteristics of only non-voiced frames is executed in parallel with the step 56 of determining the transformation function for voiced frames.

In the present embodiment, the determination step 58 includes a step 90 of determining a filter function based on spectral envelope parameters, based on pairs of non-voiced frames.

This step 90 is achieved in the conventional way by determining a Gaussian mixture model or by any other appropriate technique known in the art.

A function for transformation of the spectral envelope characteristics of non-voiced frames is achieved at the end of the determination step 58.

Figure 2B:
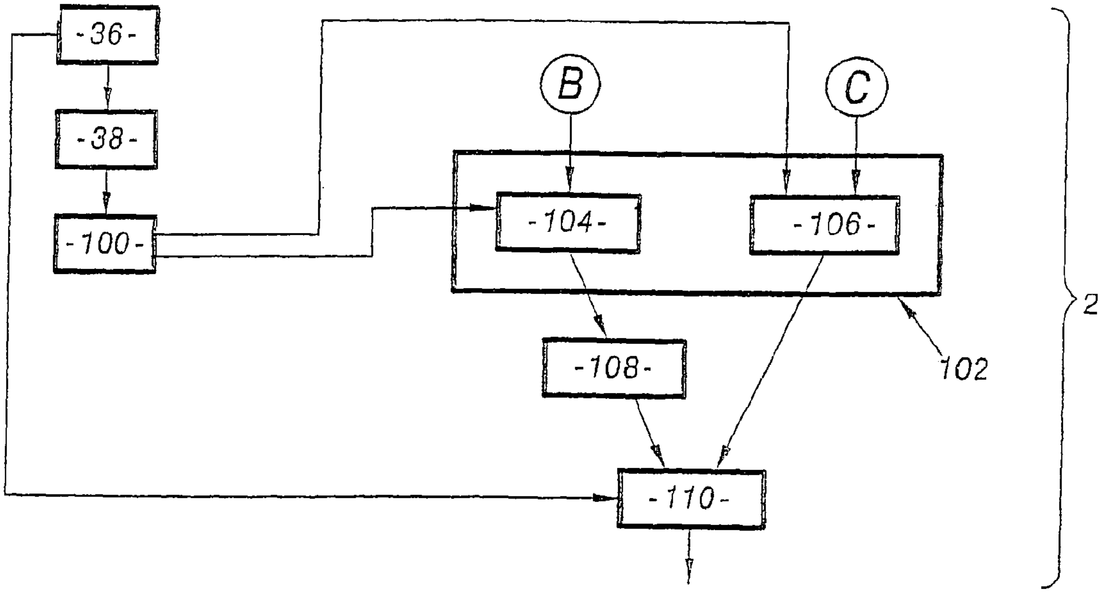
FIGS. 2A and 2B together form a general flowchart of a second embodiment of the method according to the invention.
Figure 2A:
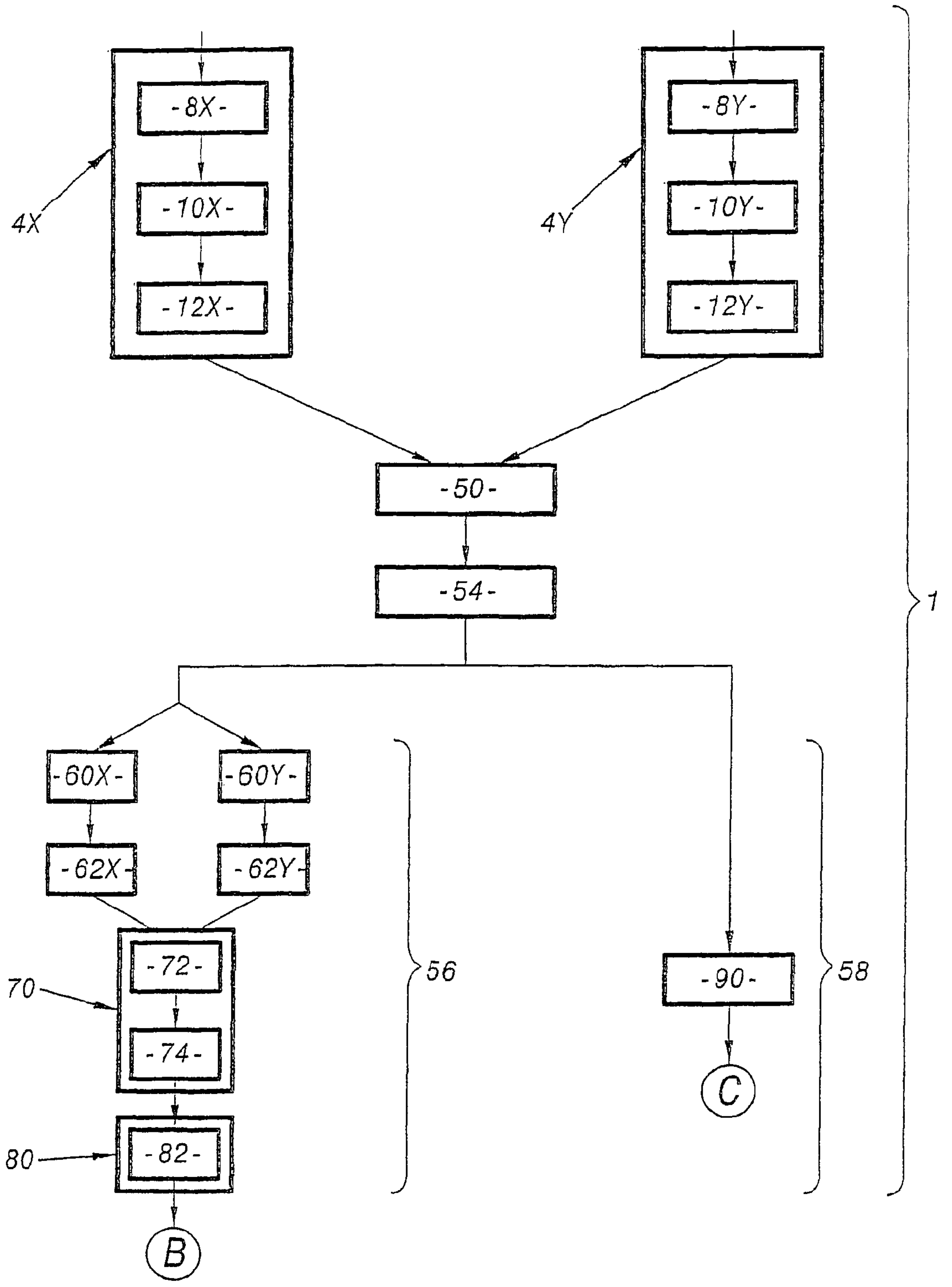

Referring to FIG. 2B, the method then includes the step 2 of transforming the acoustic characteristics of a voiced signal to be converted.

As in the previous embodiment, this transformation step 2 begins with a step 36 of analyzing the voice signal to be converted using a harmonic plus noise model (HNM) and a formatting step 38.

As stated above, these steps 36 and 38 produce the spectral envelope and normalized pitch information in the form of a single vector. The step 36 also produces maximum voicing frequency and phase information.

In the present embodiment, the step 38 is followed by a step 100 of separating voiced and non-voiced frames in the analyzed signal to be converted.

This separation is based on a criterion founded on the presence of non-null pitch information.

The step 100 is followed by a step 102 of transforming the acoustic characteristics of the voice signal to be converted by applying the transformation functions determined in the steps 80 and 90.

This step 102 more particularly includes a substep 104 of applying the function for conjoint transformation of the spectral envelope and pitch information determined in the step 80 to only the voiced frames separated out in the step 100.

In parallel, the step 102 includes a substep 106 of applying the function for transforming only the spectral envelope information determined in the step 90 to only the non-voiced frames separated out in the step 100.

The substep 104 therefore outputs, for each voiced sample frame of the source speaker signal to be converted, simultaneously transformed spectral envelope and pitch information whose characteristics are similar to those of the target speaker voiced samples.

The substep 106 outputs transformed spectral envelope information for each frame of non-voiced samples of the source speaker signal to be converted, the characteristics thereof are similar to those of the non-voiced target speaker samples.

In the present embodiment, the method further includes a step 108 of de-normalizing the transformed pitch information produced by the transformation substep 104 in a similar manner to the step 42 described with reference to FIG. 1B.

The conversion method then includes a step 110 of synthesizing the output signal, in the present example by means of an HNM type synthesis that delivers the voice signal converted on the basis of the transformed spectral envelope and pitch information and maximum voicing frequency and phase information for voiced frames and on the basis of transformed spectral envelope information for non-voiced frames.

This embodiment of the method of the invention therefore processes voiced frames and non-voiced frames differently, voiced frames undergoing simultaneous transformation of the spectral envelope and pitch characteristics and non-voiced frames undergoing transformation of only the spectral envelope characteristics.

An embodiment of this kind provides more accurate transformation than the previous embodiment while keeping a limited complexity.

The efficiency of conversion can be assessed from identical voice samples as spoken by the source speaker and the target speaker.

Thus the voice signal as spoken by the source speaker is converted by the method of the invention and the resemblance of the converted signal to the signal as spoken by the target speaker is assessed.

The resemblance is calculated in the form of a ratio between the acoustic distance between the converted signal and the target signal and the acoustic distance between the target signal and the source signal, for example.

Figure 3:
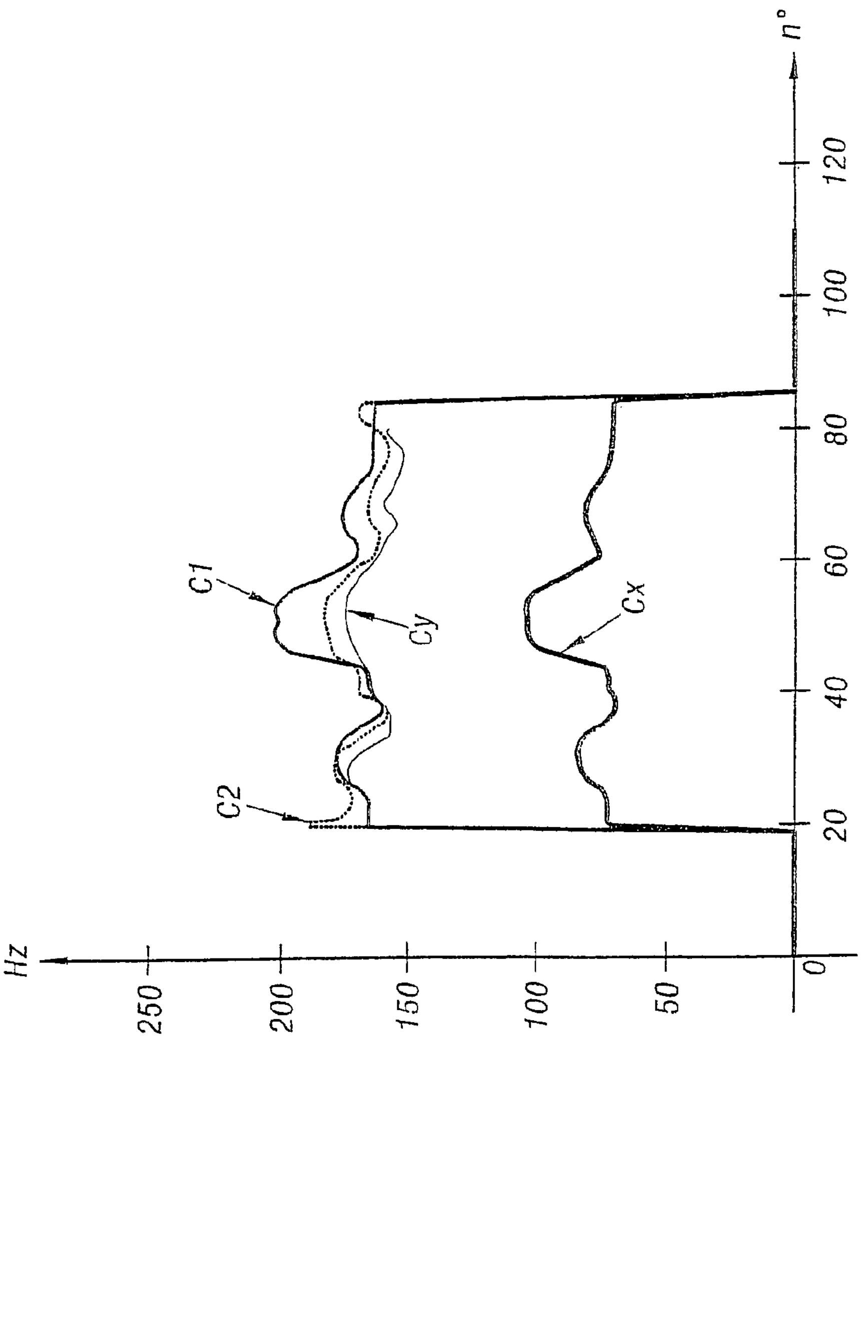
FIG. 3 is a graph view showing experimental measurements of performance of the method according to the invention.

FIG. 3 shows a graph of the results obtained in the case of converting a male voice into a female voice, the transformation functions being obtained using training bases each containing five minutes of speech sampled at 16 kHz, the cepstral vectors used being of size 20 and the Gaussian mixture model having 64 components.

In this graph the frame numbers are plotted on the abscissa axis and the signal frequency in Hertz is plotted on the ordinate axis.

The results shown are characteristic of voiced frames running from approximately frame 20 to frame. 85.

In this graph, the curve Cx represents the pitch characteristics of the source signal and the curve Cy represents ones of the target signal.

The curve C1 represents the pitch characteristics of a signal obtained by conventional linear conversion.

It is apparent that this signal has the same general shape as the source signal represented by the curve Cx.

Conversely, the curve C2 represents the pitch characteristics of a signal converted by the method of the invention as described with reference to FIGS. 2A and 2B.

It is obvious that the pitch curve of the signal converted by the method of the invention has a general shape that is very similar to that of the target pitch curve Cy.

Figure 4:
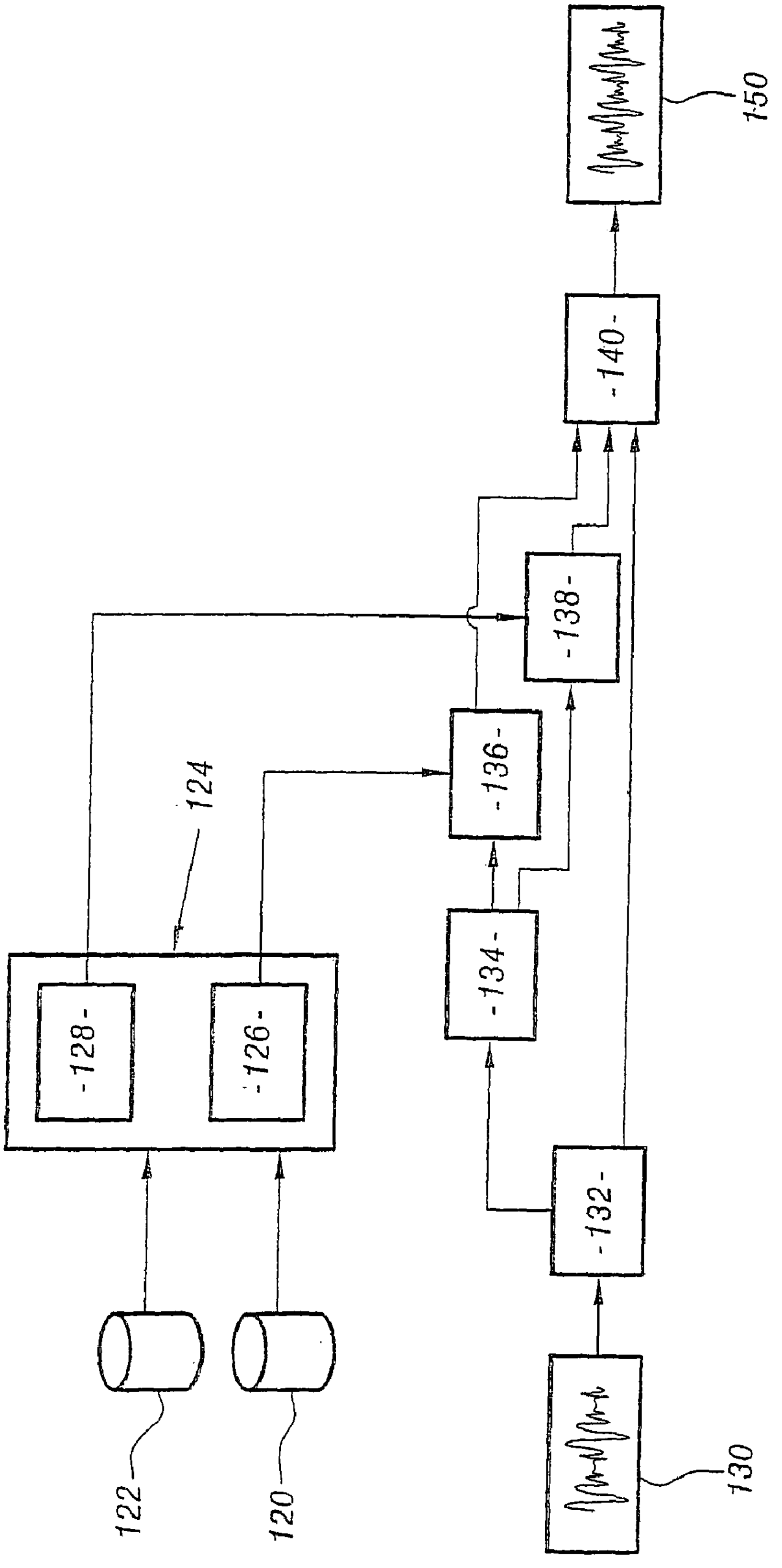
FIG. 4 is a block diagram of a system implementing a method according to the invention.

FIG. 4 is a functional block diagram of a voice conversion system using the method described with reference to FIGS. 2A and 2B.

This system uses input from a database 120 of voice samples as spoken by the source speaker and a database 122 containing at least the same voice samples as spoken by the target speaker.

These two databases are used by a module 124 for determining functions for transforming acoustic characteristics of the source speaker into acoustic characteristics of the target speaker.

The module 124 is adapted to execute the steps 56 and 58 of the method described with reference to FIG. 2 and thus can determine a transformation function for the spectral envelope of non-voiced frames and a conjoint transformation function for the spectral envelope and pitch of voiced frames.

Generally, the module 124 includes a unit 126 for determining a function for conjoint transformation of the spectral envelope and the pitch of voiced frames and a unit 128 for determining a function for transformation of the spectral envelope of non-voiced frames.

The voice conversion system receives at input a voice signal 130 to be converted reproducing the speech of the source speaker.

The signal 130 is fed into a signal analyzer module 132 producing a harmonic plus noise model (HNM) type breakdown, for example, to dissociate spectral envelope information of the signal 130 in the form of cepstral coefficients and pitch information. The module 132 also outputs maximum voicing frequency and phase information by applying the harmonic plus noise model.

Thus the module 132 implements the step 36 of the method described above and advantageously also implements the step 38.

Eventually, the information produced by this analysis may be stored for subsequent use.

The system also includes a module 134 for separating voiced frames and non-voiced frames in the analyzed voice signal to be converted.

Voiced frames separated out by the module 134 are forwarded to a transformation module 136 adapted to apply the conjoint transformation function determined by the unit 126.

Thus the transformation module 136 implements the step 104 described with reference to FIG. 2B and advantageously also implements the denormalization step 108.

Non-voiced frames separated out by the module 134 are forwarded to a transformation module 128 adapted to transform the cepstral coefficients of the non-voiced frames.

The non-voiced frame transformation module 138 therefore implements the step 106 described with reference to FIG. 2B.

The system further includes a synthesizing module 140 receiving as input, for voiced frames, the conjointly transformed spectral envelope and pitch information and the maximum voicing frequency and phase information produced by the module 136. The module 140 also receives the transformed cepstral coefficients for non-voiced frames produced by the module 138.

The module 140 therefore implements the step 110 of the method described with reference to FIG. 2B and delivers a signal 150 corresponding to the voice signal 130 for the source speaker with its spectral envelope and pitch characteristics modified to resemble those of the target speaker.

The system described may be implemented in various ways and in particular using appropriate computer programs and sound acquisition hardware.

In the context of application of the method of the invention as described with reference to FIGS. 1A and 1B, the system includes, in the form of the module 124, a single unit for determining a conjoint spectral envelope and pitch transformation function.

In such an embodiment, the separation module 134 and the non-voiced frame transformation function application module 138 are not needed.

The module 136 therefore is able to apply only the conjoint transformation function to all the frames of the voice signal to be converted and to deliver the transformed frames to the synthesizing module 140.

Generally, the system is adapted to implement all the steps of the methods described with reference to FIGS. 1 and 2.

In all cases, the system can also be applied to particular databases to form databases comprising converted signals that are ready to use.

For example, the analysis is performed offline and the HNM analysis parameters are stored for subsequent use in the step 40 or 100 by the module 134.

Finally, depending on the complexity of the signals and the quality required, the method and the system of the invention may operate in real time.

Embodiments other than those described may be envisaged, of course.

In particular, the HNM and GMM type models may be replaced by other techniques and models known to the person skilled in the art. For example, the analysis may use linear predictive coding (LPC) techniques and sinusoidal or multiband excited (MBE) models and the spectral parameters may be line spectrum frequency (LSF) parameters or parameters linked to formants or to a glottal signal. Alternatively, vector quantization (Fuzzy VQ) may replace the Gaussian mixture model.

Alternatively, the estimate used in the step 30 may be a maximum a posteriori (MAP) criterion corresponding to calculating the expectation only for the model that best represents the source-target pair.

In another variant, a conjoint transformation function is determined using a least squares technique instead of the conjoint density estimation technique described here.

In that variant, determining a transformation function includes modeling the probability density of the source vectors using a Gaussian mixture model and then determining the parameters of the model using an Expectation—Maximization (EM) algorithm. The modeling then takes into account of source speaker speech segments for which counterparts as spoken by the target speaker are not available.

The determination process then obtains the transformation function by minimizing a least squares criterion between the target and source parameters. It should be noticed that the estimate of this function is always expressed in the same way but that the parameters are estimated differently and additional data is taken into account.

The invention claimed is:

1. A method of converting a voice signal as spoken by a source speaker into a converted voice signal the acoustic characteristics thereof resemble those of a target speaker, the method comprising:

a determination step of determining a function for transforming acoustic characteristics of the source speaker into acoustic characteristics close to those of the target speaker on the basis of samples of the voices of the source and target speakers, and a transformation step of transforming acoustic characteristics of the source speaker voice signal to be converted by applying said transformation function, wherein said determination step comprises a step of determining a function for conjoint transformation of characteristics of the source speaker relating to the spectral envelope and of characteristics of the source speaker relating to the pitch and wherein said transformation step comprises applying said conjoint transformation function, wherein said step of determining a conjoint transformation function comprises, a step of analyzing source and target speaker voice samples grouped into frames to obtain for each frame information relating to the spectral envelope and to the pitch, a step of concatenating information relating to the spectral envelope and information relating to the pitch for each of the source and target speakers, a step of determining a model representing common acoustic characteristics of source speaker and target speaker voice samples, and a step of determining said conjoint transformation function from said model and the voice samples, and wherein said steps of analyzing the source and target speaker voice samples are adapted to produce said information relating to the spectral envelope in the form of cepstral coefficients.

2. A method according to claim 1, wherein said analysis steps comprise respectively a step of achieving voice samples models as a summation of an harmonic signal and noise, each achieving step comprising :

a substep of estimating the pitch of the voice samples, a substep of synchronized analysis of the pitch of each frame, and a substep of estimating spectral envelope parameters of each frame.

3. A method according to claim 1, wherein said step of determining a model determines a Gaussian probability density mixture model.

4. A method according to claim 3, wherein said step of determining a model comprises:

a substep of determining a model corresponding to a mixture of Gaussian probability densities, and a substep of estimating parameters of the mixture of Gaussian probability densities from an estimated maximum likelihood between the acoustic characteristics of the source and target speaker samples and the model.

5. A method according to claim 1, wherein said step of determining at least one transformation function further includes a step of normalizing the pitch of the frames of source and target speaker samples relative to average values of the pitch of the analyzed source and target speaker samples.

6. A method according to claim 1, including a step of temporally aligning the acoustic characteristics of the source speaker with the acoustic characteristics of the target speaker, this step being executed before said step of determining a conjoint model.

7. A method according to claim 1, including a step of separating voiced frames and non-voiced frames in the source speaker and target speaker voice samples, said step of determining a conjoint transformation function of the characteristics relating to the spectral envelope and to the pitch being based only on said voiced frames and the method including a step of determining a function for transformation of only the spectral envelope characteristics on the basis only of said non-voiced frames.

8. A method according to claim 7, including a step of separating voiced frames and non-voiced frames in the source speaker and target speaker voice samples, said step of determining a conjoint transformation function of the characteristics relating to the spectral envelope and to the pitch being based entirely on said voiced frames and the method including a step of determining a function for transformation of only the spectral envelope characteristics on the basis only of said non-voiced frames, and including a step of separating voiced frames and non-voiced frames in said voice signal to be converted, said transformation step comprising:

a substep of applying said conjoint transformation function only to voiced frames of said signal to be converted, and a substep of applying said transformation function of the spectral envelope characteristics only to non-voiced frames of said signal to be converted.

9. A method according to claim 1, wherein said step of determining at least one transformation function comprises only said step of determining a conjoint transformation function.

10. A method according to claim 1, wherein said step of determining a conjoint transformation function is achieved on the basis of an estimate of the acoustic characteristics of the target speaker, the achievement of the acoustic characteristics of the source speaker being known.

11. A method according to claim 10, wherein said estimate is the conditional expectation of the acoustic characteristics of the target speaker the achievement of the acoustic characteristics of the source speaker being known.

12. A method according to claim 1, wherein said step of transforming acoustic characteristics of the voice signal to be converted includes:

a step of analyzing said voice signal, grouped into frames, to obtain for each frame information relating to the spectral envelope and to the pitch, a step of formatting the acoustic information relating to the spectral envelope and to the pitch of the voice signal to be converted, and a step of transforming the formatted acoustic information of the voice signal to be converted using said conjoint transformation function.

13. A method according to claim 12, wherein said step of determining a transformation function comprises only said step of determining a conjoint transformation function, and wherein said transformation step comprises applying said conjoint transformation function to the acoustic characteristics of all the frames of said voice signal to be converted.

14. A method according to claim 1, further including a step of synthesizing a converted voice signal from said transformed acoustic information.

15. A system for converting a voice signal as spoken by a source speaker into a converted voice signal the acoustic characteristics thereof resemble ones of a target speaker, the system comprising:

means for determining at least one function for transforming acoustic characteristics of the source speaker into acoustic characteristics similar to ones of the target speaker on the basis of voice samples as spoken by the source and target speakers;

means for transforming acoustic characteristics of the source speaker voice signal to be converted by applying said transformation function, wherein said means for determining at least one transformation function comprise a unit for determining a function for conjoint transformation of characteristics of the source speaker relating to the spectral envelope and of characteristics of the source speaker relating to the pitch and wherein said transformation means include for applying said conjoint transformation function;

means for analyzing the voice signal to be converted, adapted to produce information relating to the spectral envelope in the form of cepstral coefficients and relating to the pitch of the voice signal to be converted; and synthesizer means for forming a converted voice signal from at least said spectral envelope and pitch information transformed simultaneously.

16. A system according to claim 15, wherein said means for determining an acoustic characteristic transformation function further include a unit for determining at least one transformation function for the spectral envelope of non-voiced frames, said unit for determining the conjoint transformation function being adapted to determine the conjoint transformation function only for voiced frames.

* * * * *